(12) United States Patent
Franzen

(10) Patent No.: US 9,091,114 B2
(45) Date of Patent: Jul. 28, 2015

(54) PROFILE SEAL WITH TRIM STRIP FOR A VEHICLE

(75) Inventor: Otto Franzen, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/006,059

(22) PCT Filed: Mar. 6, 2012

(86) PCT No.: PCT/EP2012/000989
§ 371 (c)(1),
(2), (4) Date: Sep. 18, 2013

(87) PCT Pub. No.: WO2012/126572
PCT Pub. Date: Sep. 27, 2012

(65) Prior Publication Data
US 2014/0007511 A1    Jan. 9, 2014

(30) Foreign Application Priority Data
Mar. 19, 2011 (DE) .......................... 10 2011 014 540

(51) Int. Cl.
*B60J 1/16* (2006.01)
*E06B 7/22* (2006.01)
*B60J 10/00* (2006.01)
*B60J 10/08* (2006.01)
*F16B 5/12* (2006.01)

(52) U.S. Cl.
CPC .............. *E06B 7/22* (2013.01); *B60J 10/0011* (2013.01); *B60J 10/0051* (2013.01); *B60J 10/088* (2013.01); *F16B 5/121* (2013.01)

(58) Field of Classification Search
CPC .......... E06B 7/22; F16B 5/121; B60J 10/088; B60J 10/0051
USPC ................ 49/377, 490.1, 495.1, 498.1, 475.1
See application file for complete search history.

(56) References Cited

U.S. PATENT DOCUMENTS

| 4,170,855 | A | | 10/1979 | Murray et al. |
| 5,027,556 | A | * | 7/1991 | Ginster ............................ 49/441 |
| 5,038,521 | A | * | 8/1991 | Andrzejewski et al. ......... 49/441 |
| 5,054,240 | A | * | 10/1991 | Nakahara et al. ............ 49/479.1 |

(Continued)

FOREIGN PATENT DOCUMENTS

| CN | 1729113 | 2/2006 |
| CN | 1729113 A | 2/2006 |

(Continued)

OTHER PUBLICATIONS

International Search Report issued by the European Patent Office in International Application PCT/EP2012/000989 on Apr. 16, 2012.

(Continued)

*Primary Examiner* — Jerry Redman
(74) *Attorney, Agent, or Firm* — Henry M. Feiereisen LLC

(57) ABSTRACT

A profile seal has a trim strip for a vehicle, including a clamping section for fastening the profile seal to a vehicle component, at least one sealing section for sealing contacting to at least one corresponding vehicle component, and one holding section for form-fitted receiving of the trim strip, wherein the holding section comprises at least one harder partial section along the longitudinal extension thereof and wherein the partial section is designed as an insert that consists of a harder material than the rest of the holding section.

7 Claims, 2 Drawing Sheets

(56) References Cited

U.S. PATENT DOCUMENTS

| | | | |
|---|---|---|---|
| 5,702,148 A * | 12/1997 | Vaughan et al. | 296/146.9 |
| 5,743,047 A | 4/1998 | Bonne et al. | |
| 5,799,442 A * | 9/1998 | Takahashi et al. | 49/377 |
| 6,409,251 B1 | 6/2002 | Kaye et al. | |
| 6,679,003 B2 * | 1/2004 | Nozaki et al. | 49/441 |
| 6,748,702 B2 * | 6/2004 | Jang | 49/475.1 |
| 7,055,291 B2 * | 6/2006 | Nakanishi et al. | 52/716.5 |
| 7,390,050 B2 * | 6/2008 | Nakao et al. | 296/146.1 |
| 7,407,205 B2 * | 8/2008 | Nakao et al. | 293/128 |
| 7,458,185 B2 * | 12/2008 | Imaizumi et al. | 49/377 |
| 7,478,863 B2 * | 1/2009 | Krause | 296/146.2 |
| 7,565,771 B2 * | 7/2009 | Brocke | 49/377 |
| 8,001,727 B2 * | 8/2011 | Ho et al. | 49/377 |
| 8,371,069 B2 * | 2/2013 | O'Sullivan et al. | 49/492.1 |
| 8,572,897 B2 * | 11/2013 | Dishman et al. | 49/490.1 |
| 2005/0198908 A1 * | 9/2005 | Imaizumi et al. | 49/490.1 |
| 2010/0313487 A1 * | 12/2010 | Ellis et al. | 49/502 |

FOREIGN PATENT DOCUMENTS

| | | |
|---|---|---|
| CN | 101437700 | 5/2009 |
| CN | 101437700 A | 5/2009 |
| DE | 27 58 850 | 2/1979 |
| DE | 34 32 592 A1 | 3/1980 |
| DE | 34 32 592 | 3/1986 |
| DE | 36 04 389 | 8/1986 |
| DE | 36 04 389 A1 | 8/1986 |
| DE | 43 39 033 | 5/1995 |
| DE | 102 58 825 | 7/2004 |
| DE | 600 12 173 | 7/2005 |
| WO | WO 2011/021021 | 2/2011 |
| WO | WO2011/021021 A1 | 2/2011 |

OTHER PUBLICATIONS

Chinese Search Report issued by the Chinese Patent Office on Feb. 1, 2015.

* cited by examiner

PROFILE SEAL WITH TRIM STRIP FOR A VEHICLE

CROSS-REFERENCES TO RELATED APPLICATIONS

This application is the U.S. National Stage of International Application No. PCT/EP2012/000989, filed Mar. 6, 2012, which designated the United States and has been published as International Publication No. WO 2012/126572 and which claims the priority of German Patent Application, Serial No. 10 2011 014 540.0, filed Mar. 19, 2011, pursuant to 35 U.S.C. 119(a)-(d).

BACKGROUND OF THE INVENTION

The present invention relates to a profile seal with trim strip for a vehicle having a clamping section for fastening of the profile seal at a vehicle part, at least one sealing section for sealing connection with at least one corresponding vehicle part and a holding section for form fitting reception of the decor strip wherein the holding section has at least one harder sub section along its longitudinal extent.

Such profile seals are used in the vehicle construction for sealing gaps between abutting vehicle parts. On the profile seal a decorative trim strip is form fittingly arranged.

DE 43 39 033 A1, WO 2011/021021 A1, DE 600 12 173 T2 and DE 27 58 850 A1 each show profile seals with form fittingly fastened trim strips wherein the trim strips are normally configured with a C-shaped cross section for engaging behind a holding section. It has proven disadvantageous that the trim strips can relatively easily be stripped from the holding section, which facilitates theft of such trim strips.

DE 102 58 825 B3 describes a sealing arrangement in particular for sealing and guiding a windowpane of a motor vehicle with a sealing which is formed from an elastic deformable material and has a holding section provided with recesses, and a trim strip which partially surrounds the holding section and has an upper leg and a lower leg, which engage with their hook shaped projections form fittingly in the recesses of the holding section, wherein the holding section is provided with a hollow chamber. At the respective ends of the holding section a locking member can be axially inserted which stiffens the holding section in these regions.

A disadvantage of the shown sealing arrangement is however that the locking member represents an additional component which complicates handling of the sealing arrangement and overall renders the construction more complex. In addition the holding section as a result can only be stiffened at the ends.

Object of the present invention is therefore to provide a profile seal with trim strip for a vehicle, which is as inconspicuous as possible but at the same time ensures a simple installation.

SUMMARY OF THE INVENTION

This object is solved by a profile seal with trim strip for a vehicle having a clamping section for fastening of the profile seal on a vehicle part, at least one sealing section for sealing contact with at least one corresponding vehicle part and a holding section for form fitting reception of the trim strip, wherein the holding section has at least one harder sub section along its longitudinal extent and wherein the subsection is configured as insertion part which consist of a harder material than the remaining holding section.

Due to the fact that sections of the holding section are hardened, the force required for stripping off the trim strip can be increased to a sufficiently safe amount in a targeted manner. A separate insertion part offers advantages during manufacture because the insertion part and the remaining holding section consist of materials of different hardness and stiffness. The choice of the length and of the material of the sub section allows adjusting the required force that has to be exerted during installation and in case of an attempted theft. The holding section is completely covered in the installed condition by the trim strip, which ensures an especially inconspicuous securing of the trim strip.

In a preferred embodiment the insertion part latchingly engages with the holding section. This allows producing a profile seal according to the invention particularly easily.

In a preferred embodiment the insertion part is held with the profile seal by partial trim strip around. Due to the fact that the insertion part is molded around a profile seal according to the invention can be produced particularly easily and cost effectively. Together with the insertion part an end cap can be molded around for lateral closure of the profile seal. For this, the insertion part and the extruded profile seal is inserted into the tool and the end cap is injection molded on so that the insertion part is held by the end cap.

In a preferred embodiment the holding section has an indentation in which the trim strip can engage. The holding section has a mushroom shaped cross section in which the essentially c-shaped decor plate can engage.

In a preferred embodiment the subsection is arranged in an end-side border region of the profile seal, the subsection can be arranged in such a border region particularly easily and at the same time provides a good resistance to being stripped off because it is often attempted to raise the decor strip at its end.

In a preferred embodiment the insertion part and the holding section have an identically shaped cross section.

A vehicle with a profile seal according to the invention has the profile seal preferably in the region of the windowpane wherein the sealing section rests against a windowpane and the clamping section is held by a door frame.

BRIEF DESCRIPTION OF THE DRAWING

Further details and advantages of the invention become apparent from the following description of a preferred exemplary embodiment with reference to the drawings.

Therein it is shown in.

DETAILED DESCRIPTION OF PREFERRED EMBODIMENTS

Figure 1:
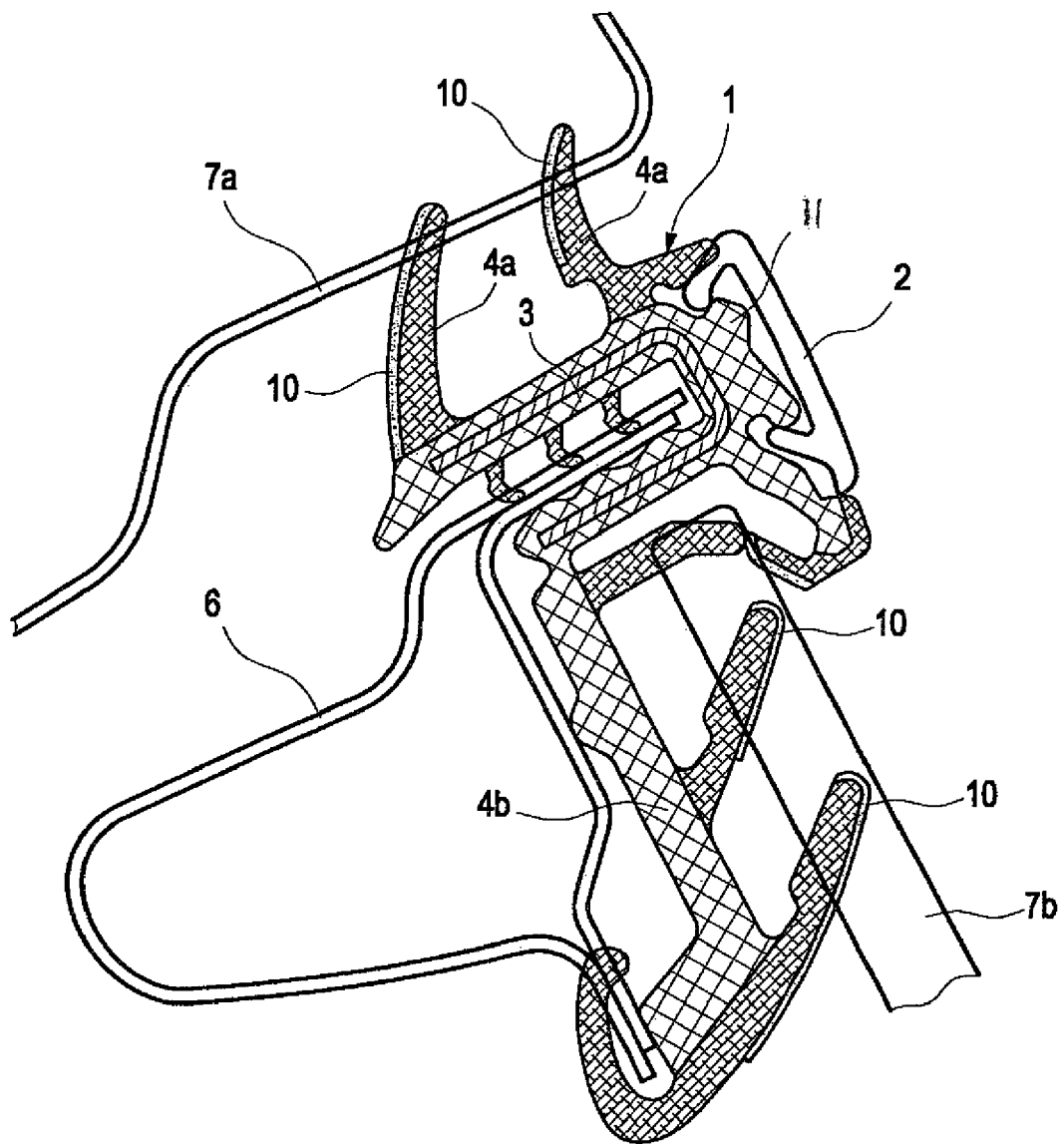
FIG. 1 a sectional view of a profile seal with trim strip taken along line A-A of FIG. 2b.

According to FIG. 1, a profile seal 1 with trim strip for a vehicle has a clamping section 3 for form fitting or force fitting fastening on a vehicle part 6. Starting form the clamping section 3 a first sealing section 4a formed by two sealing lips, rests sealingly against a corresponding vehicle body element 7a, whole a second sealing section 4b, also formed by two sealing lips, sealingly rests against a glazing 7b. The sealing sections 4a and 4b are each coated with a friction decreasing flocking 10. A holding section 11 carries a decorative trim strip 2 which is visible from outside the vehicle. The holding section 11 has an essentially mushroom shaped cross section with indentation into which the c-shaped trim strip can engage form fittingly.

Figure 2:
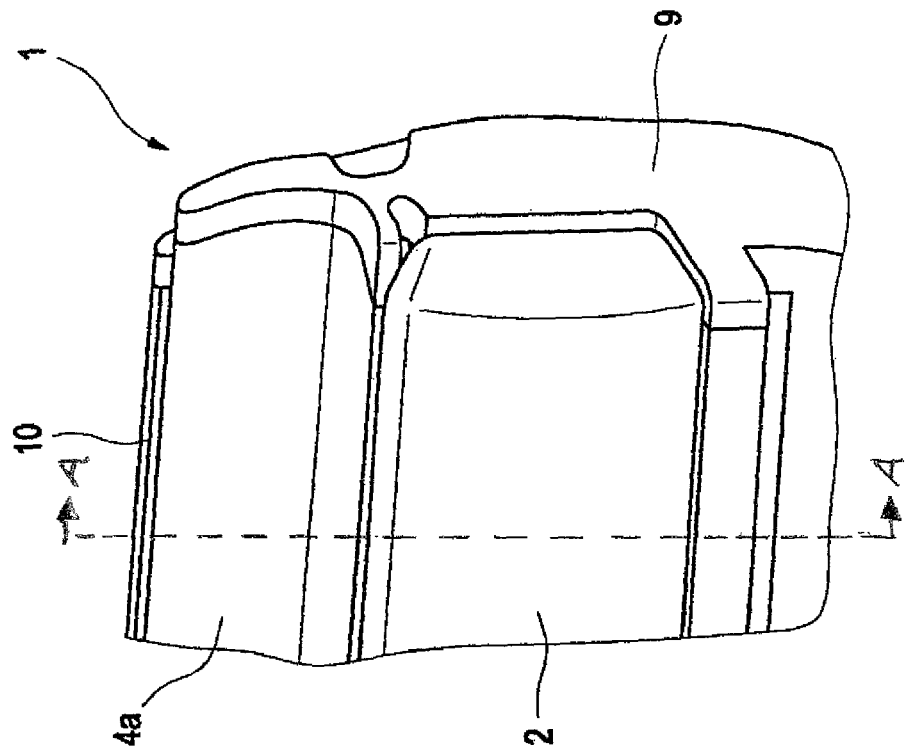
FIG. 2a a top view onto a profile seal without trim strip.
FIG. 2b a top view onto a profile seal with trim strip.
Figure 2:
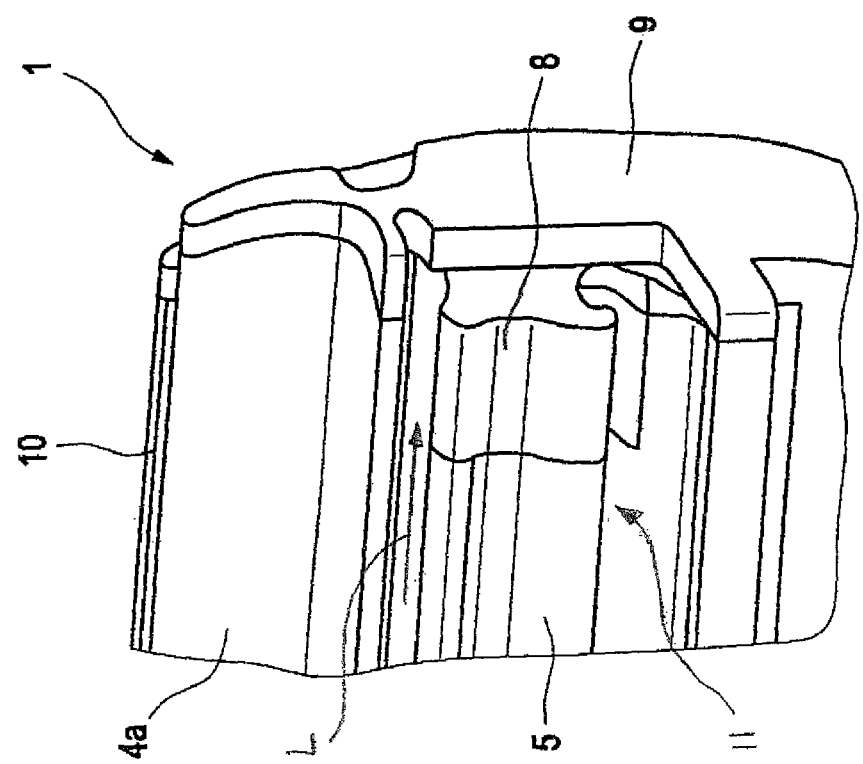

As can be seen from FIG. 2a, the holding section 11 has identically formed subsections 5 and 8, with subsection 8 being formed as a separate insertion part and arranged in an end-side border region of the profile seal 1. The subsections 5, 8 have the same cross sectional contour along a longitudinal extent of the holding section 11 indicated by the arrow L. The subsection 8 is formed by a harder and stiffer material than the subsection 5 and is latchingly engaged with the subsection 5. The entire profile seal 1 is laterally closed by and end cap 9. In FIG. 2b the holding section 11 carries the trim strip 2, wherein the trim strip 2 completely covers the subsection 5 and the subsection 8. The profile seal 1 is preferably produced according to the co-extrusion method.

The invention claimed is:

1. A profile seal with trim strip for a vehicle, comprising:
    a clamping section for fastening the profile seal on a vehicle part;
    at least one sealing section in sealing contact with at least one other corresponding vehicle part; and
    a holding section which mounts the trim strip, said holding section having a first subsection along a longitudinal extent of the holding section, said first subsection being made of a first material, and a second subsection along the longitudinal extent constructed as a separate insertion part and being made of a second material, said first and second subsections having a same cross sectional contour along the longitudinal extent of the holding section, said second subsection being made of a harder material than the first subsection.

2. The profile seal of claim 1, wherein the insertion part latchingly engages with the first subsection of the holding section.

3. The profile seal of claim 1, wherein the insertion part is held on the profile seal by by extrusion molding of the profile seal around at least a portion of the insertion part.

4. The profile seal of claim 1, further comprising an end cap, wherein the insertion part together with the end cap is held on the profile seal by extrusion molding of the profile seal around at least a portion of the insertion part and the end cap.

5. The profile seal of claim 1, wherein the holding section has an indentation, and wherein the trim strip is engageable in the indentation.

6. The profile seal of claim 1, wherein the second subsection is arranged in a border region of an end side of the profile seal.

7. A motor vehicle, comprising a profile seal with trim strip, said profile seal comprising
    a clamping section for fastening the profile seal on a vehicle part;
    at least one sealing section in sealing contact with at least one other corresponding vehicle part; and
    a holding section which mounts the trim strip, said holding section having a first subsection along a longitudinal extent of the holding section, said first subsection being made of a first material, and a second subsection along the longitudinal extent constructed as an insertion part and being made of a second material, said first and second subsections having a same cross sectional contour along the longitudinal extent of the holding section, said second subsection being made of a harder material than the first subsection.

* * * * *